(12) United States Patent
Schüssler

(10) Patent No.: US 9,787,243 B2
(45) Date of Patent: Oct. 10, 2017

(54) CONTROLLER FOR A BRUSHLESS DIRECT-CURRENT MOTOR

(71) Applicant: MAGNA POWERTRAIN BAD HOMBURG GMBH, Bad Homburg (DE)

(72) Inventor: Markus Schüssler, Aschaffenburg (DE)

(73) Assignee: MAGNA POWERTRAIN BAD HOMBURG GMBH, Bad Homburg (DE)

( * ) Notice: Subject to any disclaimer, the term of this patent is extended or adjusted under 35 U.S.C. 154(b) by 0 days.

(21) Appl. No.: 14/395,125

(22) PCT Filed: Apr. 18, 2013

(86) PCT No.: PCT/EP2013/058110
§ 371 (c)(1),
(2) Date: Oct. 17, 2014

(87) PCT Pub. No.: WO2013/156571
PCT Pub. Date: Oct. 24, 2013

(65) Prior Publication Data
US 2015/0130382 A1    May 14, 2015

(30) Foreign Application Priority Data
Apr. 19, 2012    (DE) .................. 10 2012 206 420

(51) Int. Cl.
*H02H 7/09*    (2006.01)
*H02P 29/02*    (2016.01)
(Continued)

(52) U.S. Cl.
CPC ............... *H02P 29/02* (2013.01); *H02P 3/12* (2013.01); *H02P 3/22* (2013.01); *H02P 6/18* (2013.01); *H02P 6/182* (2013.01); *H02P 6/24* (2013.01)

(58) Field of Classification Search
CPC .. H02P 6/24; H02K 1/246; H02K 2/46; B25B 21/00; B24B 23/14
See application file for complete search history.

(56) References Cited

U.S. PATENT DOCUMENTS 6,215,261 B1 *   4/2001   Becerra ................... H02P 6/085
                                                                318/375
2005/0062494 A1 *  3/2005  Bui .......................... H02P 8/36
                                                                324/765.01
(Continued)

FOREIGN PATENT DOCUMENTS

WO    WO2004068693    8/2004
WO    WO2008023779    2/2008

OTHER PUBLICATIONS

International Search Report and Written Opinion dated Nov. 28, 2013 for corresponding PCT Application No. PCT/EP2013/058110.

*Primary Examiner* — Shawki S Ismail
*Assistant Examiner* — Zoheb Imtiaz
(74) *Attorney, Agent, or Firm* — Gardner, Linn, Burkhart & Flory, LLP

(57) ABSTRACT

A controller for a brushless direct-current motor having an upstream converter, which has a half-bridge having a pair of switching means for each phase winding of the motor, includes a measuring device or has a signal connection to a measuring device. The measuring device is associated with a half-bridge and by means of the measuring device, the induced voltage, the counterelectromotive force of a phase winding, can be detected for rotor position detection in the current-free state, for which purpose the controller, in an operating mode that causes the braking and in which the switching means cause a short circuit of the phase windings, briefly opens the switching means associated with the measuring device in order to determine a rotor motion.

20 Claims, 1 Drawing Sheet

(51) Int. Cl.
*H02P 3/12* (2006.01)
*H02P 6/18* (2016.01)
*H02P 3/22* (2006.01)
*H02P 6/182* (2016.01)
*H02P 6/24* (2006.01)

(56) References Cited

U.S. PATENT DOCUMENTS

| | | | | |
|---|---|---|---|---|
| 2008/0224650 A1* | 9/2008 | Ito | ............ | H02P 6/182 318/805 |
| 2009/0278352 A1* | 11/2009 | Rivas | ............ | F03D 7/0224 290/44 |
| 2010/0138127 A1* | 6/2010 | Boughtwood | ............ | B60L 7/006 701/71 |

* cited by examiner

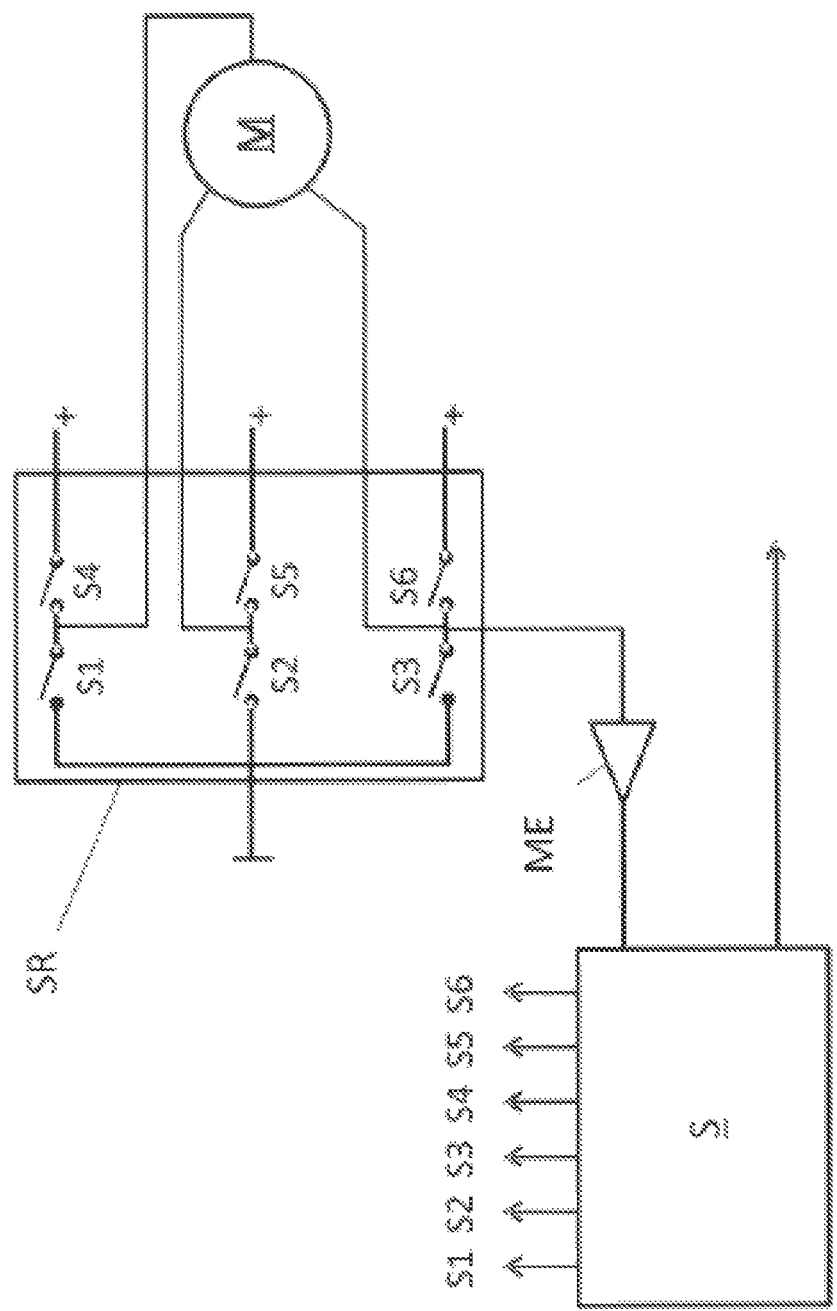

CONTROLLER FOR A BRUSHLESS DIRECT-CURRENT MOTOR

CROSS REFERENCE TO RELATED APPLICATION

The present application is a 371 U.S. national phase application of PCT Application No. PCT/EP2013/0581, filed Apr. 18, 2013, which claims the filing benefit of German Application No. 10 2012 206 420.6, filed Apr. 19, 2012.

FIELD OF THE INVENTION

The invention relates to a controller for a brushless DC motor.

BACKGROUND OF THE INVENTION

Brushless DC motors of the known type use optical or magnetic sensors to detect the rotor position, which sensors generate a signal corresponding to the rotor position via downstream evaluation electronics. Said signal is used to perform energization of the motor windings via a converter in a manner synchronous with the rotor position. The rotor position can also be determined by detecting the voltage induced in the motor windings, the back-emf. The zero-crossings of the voltage induced by the rotor field in the respectively non-energized phase are detected. In the case of such controllers, an additional sensor is omitted.

DE 10 2007 040 217 A1 describes a controller for a sensorless electronically commutated DC motor. The zero-crossings of the voltage induced by the rotor field in the respectively non-energized phase are determined. In order to be able to rule out zero-crossings caused by disturbances, the instants for the zero-crossings are calculated in advance and the crossings which can be detected in a time period are evaluated. DE 10 2009 045 247 A1 and EP 822 649 B1 also describe sensorless rotor-position detection.

SUMMARY OF THE INVENTION

The drive of a fan assigned to the heat exchanger of a motor vehicle is to be embodied in as inexpensive a way as possible, correspondingly, said drive is embodied as a brushless DC motor with sensorless rotor-position detection.

In certain operation situations, the motor is braked by short-circuiting of the phases. In the case of a high external torque, breakaway can occur, that is to say said external torque drives the rotor, the torque increases suddenly, the brake function is ineffective.

The problem addressed by the present invention consists in improving a controller for a brushless DC motor compared to known controllers and, in particular, enabling identification of the breakaway without expenditure in terms of construction.

This problem is solved by the features of claim 1. Developments emerge from the dependent claims.

BRIEF DESCRIPTION OF THE DRAWINGS

FIG. 1 is a schematic of a controller for a brushless DC motor in accordance with the present invention.

DESCRIPTION OF THE PREFERRED EMBODIMENTS

The invention proceeds from a controller for a brushless DC motor with upstream converter, which has a half-bridge with a pair of switching means for each phase winding of the motor and the controller comprises a measuring device which is assigned to a half-bridge and by means of which, for the purpose of rotor-position detection in the de-energized state, the induced voltage, the back-emf of a phase winding is detectable.

The invention further develops this controller to the effect that the switching means for determining a rotor movement, which switching means are assigned to the measuring device, are temporarily opened in one of the operating modes which actuate the brakes, in which mode the switching means effect a short-circuit of the phase windings.

During the temporary opening of the switching means, the controller determines the movement, the rotational speed of the rotor and compares this rotational speed value with a predefined threshold value. If said rotational speed threshold is exceeded, the motor is identified as having broken away and corresponding signals can be output and/or measures can be taken.

The time period in which the temporary opening of the switching means, which are closed in the braking mode, is effected is selected such that the braking effect is only insignificantly or imperceptibly reduced.

In addition, an embodiment of the invention is explained with reference to the drawing.

The FIGURE shows an electronically commutated DC motor M, which has a permanently excited rotor. The three phase windings in the stator are energized via three half-bridges with, in total, six switching means S1, S4, S2, S5, S3, S6 embodied as MOSFETs of an upstream converter SR. The switching means S1, S4, S2, S5, S3, S6 are switched according to the rotor position of the motor M, for which purpose said switching means have a signal connection to a controller S.

The half-bridge S3, S6 has a signal connection to a measuring device ME, by means of which the voltage, the back-emf, induced in the phase winding by the rotor movement is detectable in the de-energized state of the corresponding phase winding. Said back-emf is evaluated in the controller as rotor position signal and, correspondingly, the switching means S1, S4, S2, S5, S3, S6 in the half-bridges are actuated.

In one of the operating modes of the motor M which actuate the brakes, the switching means S1, S2, S3 are connected with the braking mode, that is to say conductively, such that the phase windings are short-circuited. In the case of an excessively high external torque on the rotor shaft, the rotor is no longer held and runaway can occur.

In order to detect a breakaway caused in this way, the switching means S3 of the half-bridge to which the measuring device ME is connected is temporarily opened, with the result that a voltage induced by a rotor movement is detectable. The controller S determines a rotational speed value from the frequency of the induced voltage. In the event of a rotational speed threshold being exceeded, this is evaluated as a breakaway of the motor and the controller S can output a corresponding signal.

The described embodiment of the invention is preferably realized in the form of a piece of software in a conventional controller.

LIST OF REFERENCE SIGNS

M motor, DC motor
SR converter
S controller
ME measuring device back-emf
S1-S6 switching means half-bridge

The invention claimed is:

1. A controller for a brushless DC motor with upstream converter, said controller comprising:
a half-bridge with a pair of switches for each phase winding of the brushless DC motor, wherein each pair of switches comprises a first switch and a second switch;
wherein the controller comprises one of (i) a measuring device and (ii) a signal connection to a measuring device;
wherein the measuring device is assigned to one of the half-bridge pairs of switches, and wherein the measuring device is operable to detect the induced voltage to determine rotor position of a rotor of the motor; and
wherein, when in a motor braking mode where the first switches of the half-bridge pairs of switches effect a short-circuit of the phase windings, the first switch of the one of the half-bridge pairs of switches is temporarily opened for a period of time by the controller to determine rotor movement of the rotor during the motor braking mode, and wherein the first switch of the one of the half-bridge pairs of switches is episodically opened for the period of time and then closed during the motor braking mode.

2. The controller according to claim 1, wherein, during the motor braking mode, a rotational speed value of the rotor can be determined from the signal of the measuring device when the first switch of the one of the half-bridge pairs of switches is temporarily opened.

3. The controller according to claim 2, wherein the rotational speed value determined from the signal of the measuring device during the motor braking mode is compared with a threshold value and, if the threshold is exceeded, the controller determines a breakaway of the motor.

4. The controller according to claim 3, wherein, responsive to determination of a breakaway of the motor, the controller outputs a corresponding signal to control the motor.

5. The controller according to claim 4, wherein the motor is braked by short-circuiting of the phases, and wherein the determined breakaway is indicative of an external torque driving the rotor.

6. The controller according to claim 1, wherein the controller controls the pairs of switches responsive to the determined rotor position.

7. The controller according to claim 1, wherein the brushless DC motor comprises a fan motor for a heat exchanger of a motor vehicle.

8. A controller for a brushless DC motor with upstream converter, said controller comprising:
a half-bridge with a pair of switches associated with a respective phase winding of the brushless DC motor, wherein each pair of switches comprises a first switch and a second switch;
wherein the controller is responsive to a measuring device to determine the rotor position of a rotor of the motor;
wherein, responsive to a determined rotor position, the controller controls the switches to energize the phase windings of the motor;
wherein the measuring device is connected to one of the half-bridge pairs of switches; and
wherein, when in a motor braking mode with the first switches closed, the controller is operable to determine rotor movement of the rotor during the motor braking mode by temporarily opening for a period of time the first switch of the one of the half-bridge pairs of switches such that a voltage induced by rotor movement is determined, and wherein the first switch of the one of the half-bridge pairs of switches is episodically opened for the period of time and then closed during the motor braking mode.

9. The controller according to claim 8, wherein, during the motor braking mode, a rotational speed value of the rotor is determined from the determined voltage.

10. The controller according to claim 9, wherein the determined rotational speed value, during the motor braking mode, is compared with a threshold value and, if the threshold is exceeded, the controller determines a breakaway of the motor.

11. The controller according to claim 10, wherein, responsive to determination of a breakaway of the motor, the controller outputs a corresponding signal.

12. The controller according to claim 11, wherein the motor is braked by short-circuiting of the phases, and wherein the determined breakaway is indicative of an external torque driving the rotor.

13. The controller according to claim 8, wherein the controller comprises one of (i) the measuring device and (ii) a signal connection to the measuring device.

14. The controller according to claim 8, wherein, when in the motor braking mode, the first switches of the half-bridge pairs of switches effect a short-circuit of the phase windings.

15. The controller according to claim 8, wherein the brushless DC motor comprises a fan motor for a heat exchanger of a motor vehicle.

16. A controller for a brushless DC motor with upstream converter, said controller comprising:
a half-bridge with a pair of switches associated with a respective phase winding of the brushless DC motor, wherein each pair of switches comprises a first switch and a second switch;
wherein the controller is responsive to a measuring device to determine the rotor position of a rotor of the motor;
wherein, responsive to a determined rotor position, the controller controls the switches to energize the phase windings of the motor;
wherein the measuring device is connected to one of the half-bridge pairs of switches;
wherein, when in a motor braking mode, the controller is operable to determine rotor movement of the rotor during the motor braking mode by temporarily opening for a period of time the first switch of the one of the half-bridge pairs of switches such that a voltage induced by rotor movement is determined, and wherein the first switch of the one of the half-bridge pairs of switches is episodically opened for the period of time and then closed during the motor braking mode;
wherein the controller determines, during the motor braking mode, a rotational speed of the motor responsive to the determined voltage; and
wherein, responsive to the determined rotational speed being greater than a threshold speed during the motor braking mode, the controller generates an output to control the motor.

17. The controller according to claim 16, wherein the motor is braked by short-circuiting of the phases during the motor braking mode.

18. The controller according to claim 17, wherein, responsive to the determined rotational speed being greater than the threshold speed during the motor braking mode, the controller determines that an external torque is driving the rotor above a threshold level.

19. The controller according to claim 16, wherein the controller comprises one of (i) the measuring device and (ii) a signal connection to the measuring device.

20. The controller according to claim 16, wherein the brushless DC motor comprises a fan motor for a heat exchanger of a motor vehicle.

* * * * *